No. 633,380. Patented Sept. 19, 1899.
C. HOERL.
GAS ENGINE AND GOVERNING DEVICE THEREFOR.
(Application filed Dec. 20, 1898.)
(No Model.) 5 Sheets—Sheet 1.

WITNESSES:
A. R. Krousse
Russell M. Everitt

INVENTOR:
Conrad Hoerl,
BY Drake & Co.
ATTORNEYS.

No. 633,380. Patented Sept. 19, 1899.
C. HOERL.
GAS ENGINE AND GOVERNING DEVICE THEREFOR.
(Application filed Dec. 20, 1898.)
(No Model.) 5 Sheets—Sheet 2.

WITNESSES:
A. R. Krousse
Russell M. Everett

INVENTOR:
Conrad Hoerl,
BY Drake & Co.,
ATTORNEYS.

No. 633,380. Patented Sept. 19, 1899.
C. HOERL.
GAS ENGINE AND GOVERNING DEVICE THEREFOR.
(Application filed Dec. 20, 1898.)
(No Model.) 5 Sheets—Sheet 3.

WITNESSES:
A. R. Krousse
Russell M. Everett

INVENTOR
Conrad Hoerl,
BY Drake & Co.
ATTORNEYS.

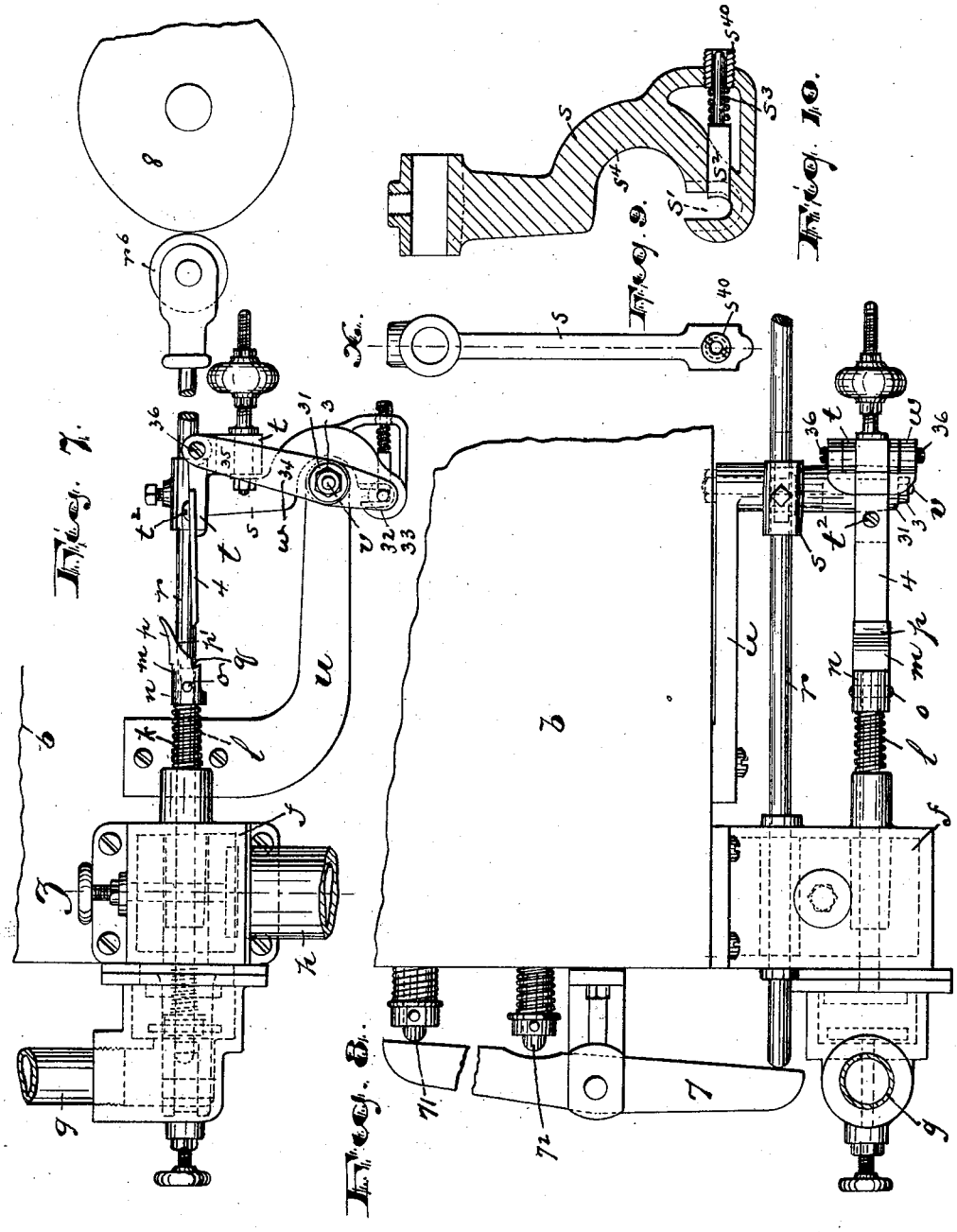

UNITED STATES PATENT OFFICE.

CONRAD HOERL, OF NEWARK, NEW JERSEY.

GAS-ENGINE AND GOVERNING DEVICE THEREFOR.

SPECIFICATION forming part of Letters Patent No. 633,380, dated September 19, 1899.

Application filed December 20, 1898. Serial No. 699,814. (No model.)

*To all whom it may concern:*

Be it known that I, CONRAD HOERL, a citizen of the United States, residing at Newark, in the county of Essex and State of New Jersey, have invented certain new and useful Improvements in Gas-Engines and Governing Devices Therefor; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

The objects of this invention are to simplify the engine, and thereby reduce the cost of construction, and at the same time to secure a more perfectly uniform and steady action of the machine, whereby there will be an increased regularity in the transmission of power, thereby rendering the machine particularly useful in the production of power for electric lights, &c., and to secure other advantages and results, some of which may be referred to hereinafter in connection with the description of the working parts.

The invention consists in the improved governing apparatus for gas-engines and in the arrangements and combinations of parts, all substantially as will be hereinafter set forth and finally embraced in the clauses of the claim.

Figure 1:
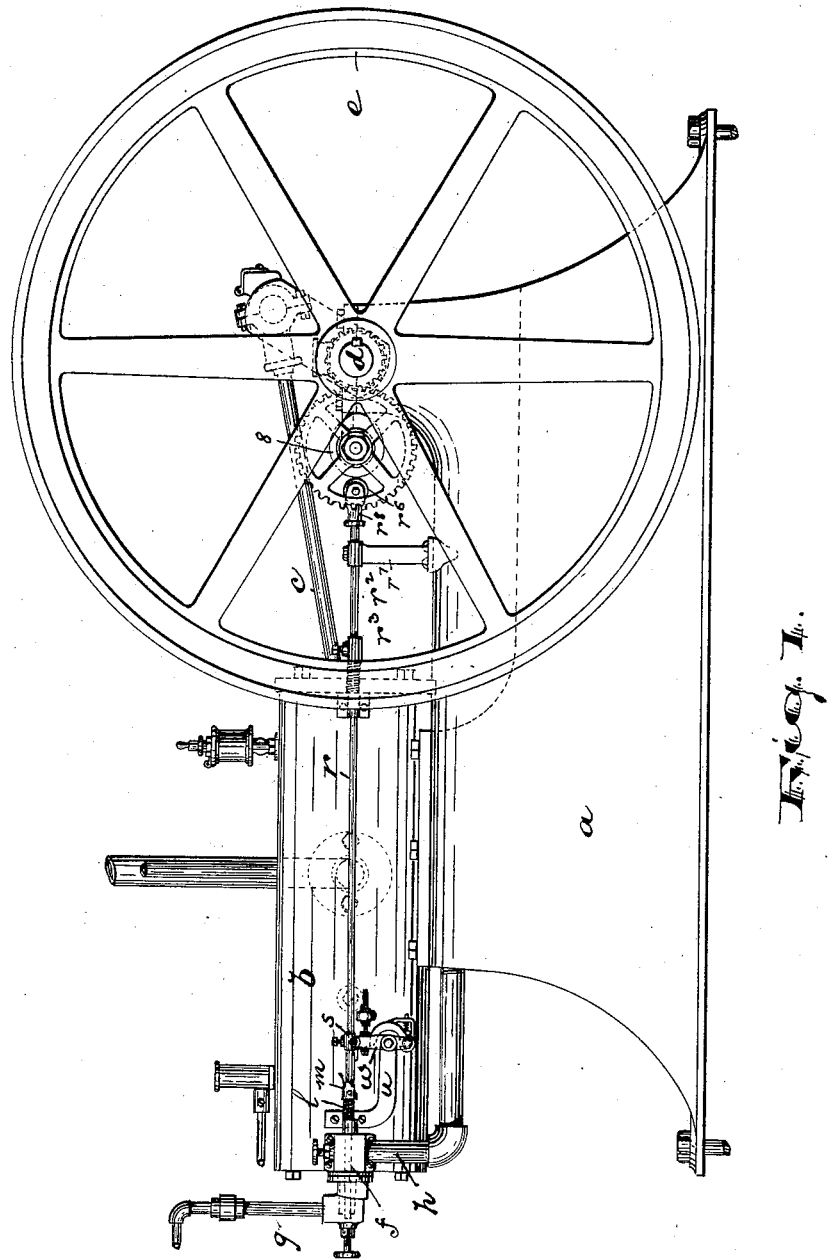
Figure 2:
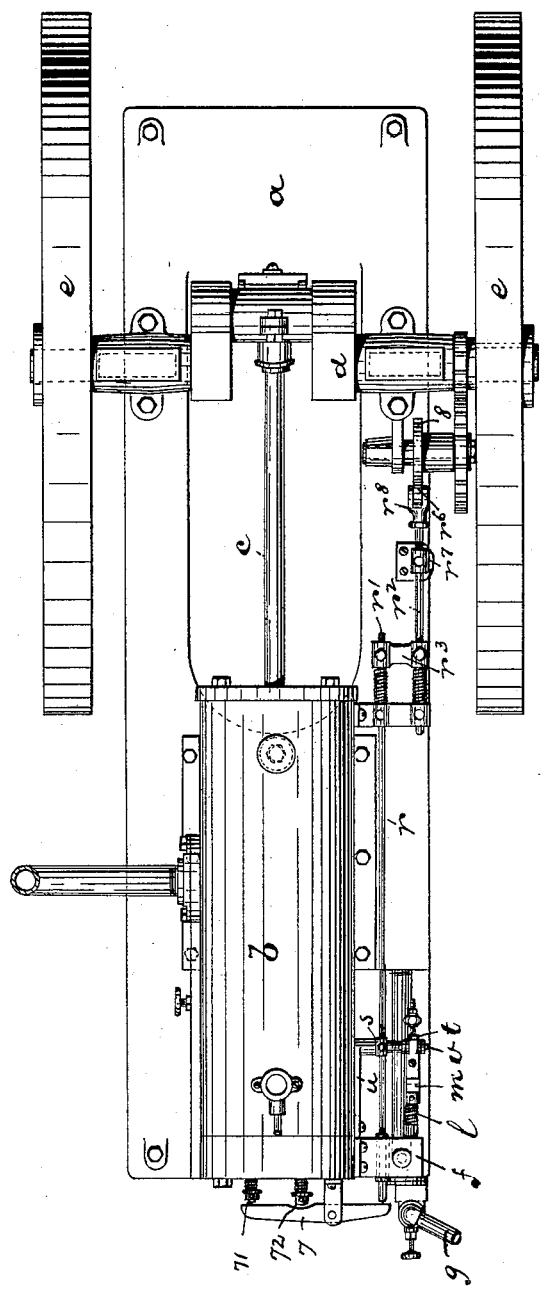
Figure 3:
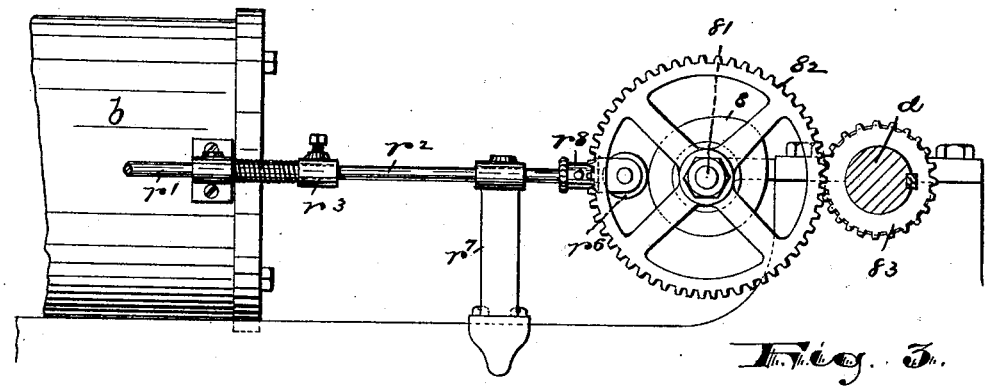
Figure 4:
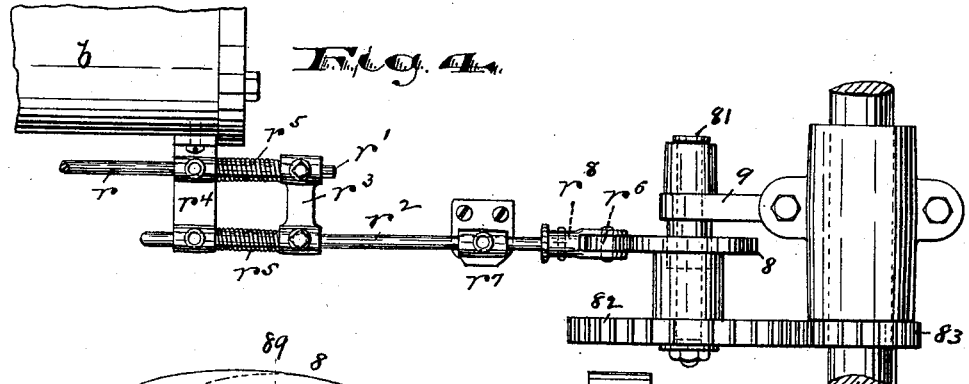
Figure 5:
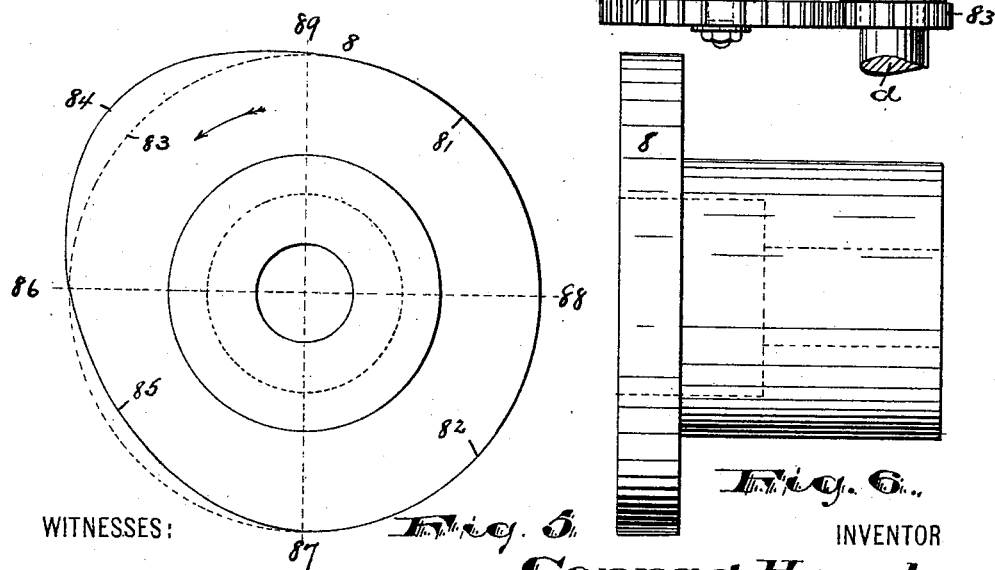
Figure 6:
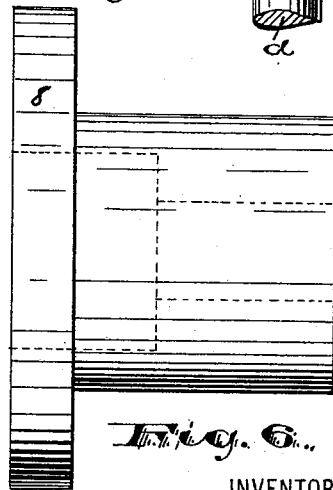
Figures 11, 12:
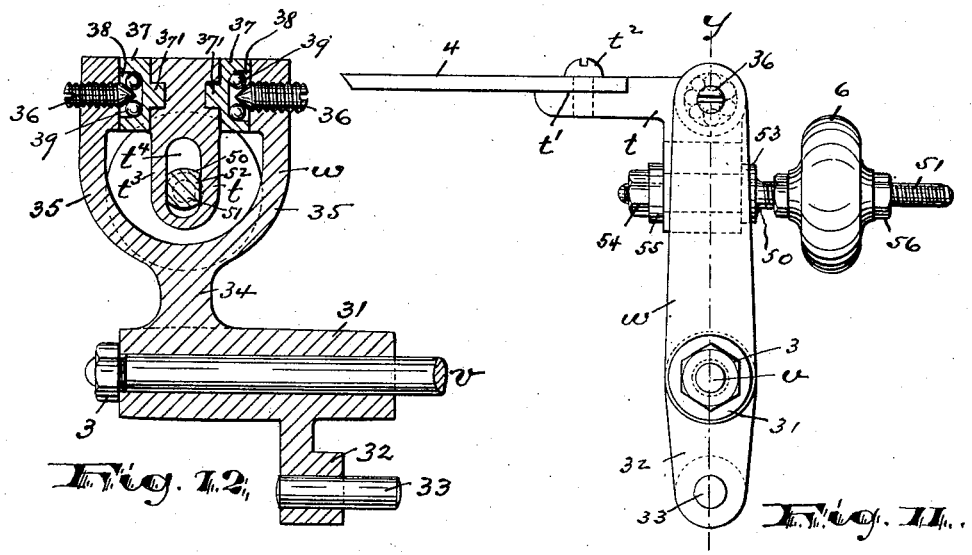
Figure 13:
Figure 14:
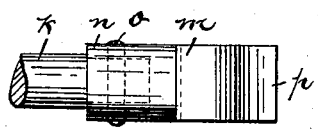
Figure 15:
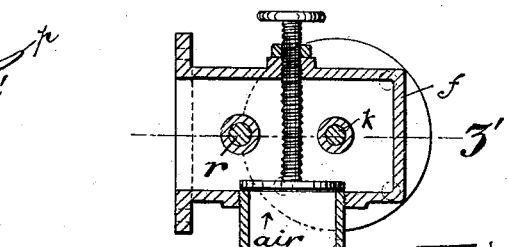

Referring to the accompanying drawings, in which like letters and numerals of reference indicate corresponding parts in each of the several views, Figure 1 is a side elevation of an engine having governing devices embodying my improvements. Fig. 2 is a plan of the same. Fig. 3 is a side elevation showing, on an enlarged scale, a certain valve-rod and cam, cam-operating means, and coöperating parts. Fig. 4 is a plan of the same. Figs. 5 and 6, respectively, are a side elevation and a plan of the said cam on a still larger scale. Fig. 7 is a side elevation of the governing device and coöperating parts, and Fig. 8 is a plan of the same. Figs. 9 and 10 are respectively an edge view and section on line $x$ of a certain rod connection for operating the governor. Fig. 11 is a side elevation in detail of the governor proper. Fig. 12 is a section of the same on line $y$. Figs. 13 and 14 are respectively a detail side view and plan of a valve-rod head adapted to receive a certain pushing-knife of the governing-pendulum. Fig. 15 is a sectional view of the gas-mixing chamber and its valve, the section being taken through line $z$ of Fig. 7; and Fig. 16 is a sectional view of the same, taken at line $z'$ of Fig. 15.

In said drawings, $a$ indicates a suitable bed plate or frame upon which the engine is built. $b$ is a cylinder; $c$, the piston-rod; $d$, the crank-shaft connected with said piston-rod, and $e$ is a fly-wheel arranged on said crank-shaft. At the end of the cylinder opposite the end open to receive the piston-rod $c$ is arranged means for supplying the cylinder with inflammable or explosive gas, of which $f$ indicates a mixing-chamber in open connection with the said cylinder, $g$ the gas-pipe leading to said mixing-chamber, and $h$ the air-pipe, also leading to said mixing-chamber.

The parts thus described are of any suitable construction common in this class of engines and may be varied to suit various conditions.

Figure 16:
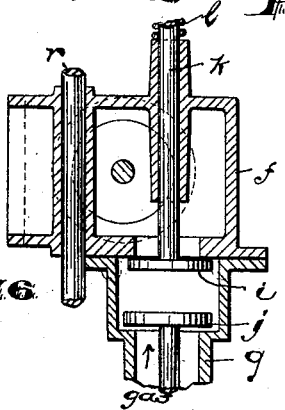

The mixing-chamber $f$, as indicated in Figs. 8, 15, and 16, is provided with a valve $i$, Fig. 16, which controls the inflow of inflammable gas, and a valve $j$ for regulating the supply of the said inflammable gas. The said valve $i$ is arranged on a valve-rod $k$ and is held normally closed by a spring $l$ on said rod outside of the mixing-chamber. These features are also old in the art and need no further detail description.

Outside of the mixing-chamber the valve-rod $k$ is provided with a head $m$ to receive the pushing-knife. The said head is of peculiar construction and is adapted to permit a free oscillatory and reciprocal action of the pushing-knife without any interference when the machine is in normal operation; but when the said machine is being started prior to any free movement thereof under the impulse given by the explosion of gas the said head serves to guide the said knife and hold the same in its operative position. To this end the said head, as shown in Figs. 7, 13, and 14, comprises a casting having a collar $n$, adapted to fit upon the valve-rod at the forward or outer extremity thereof and fixed thereon by a pin $o$. At the upper forward end of the said head the same is provided with an upwardly and forwardly extending tongue $p$. This is curved or convex on the under inclined forward side, as at $p'$, Fig. 13. The concave walls are so disposed in relation to the pushing-knife that the said pushing-knife has a free movement when in operation without engagement with the said walls, and yet the curved surfaces of the said walls serve to receive the said knife when the machine is being started by hand-power and serves to guide the edge of the said knife downward to the knife-bearing notch or groove $q$. The projecting end of the head also serves to prevent the knife from rising under the power of the pendulum-weight out of a proper operative position.

The pendulum-knife 4 and the governor connected therewith are reciprocated or given a reciprocal action by the valve-rod $r$, as will be hereinafter more fully described. In connection with said valve-rod I have provided a depending connection $s$, Figs. 7, 8, 9, and 10, adapted to receive or engage a portion of the pendulum $t$. Upon the cylinder $b$, contiguous to the said connection $s$ of the valve-rod, is arranged a bracket $u$, and upon said bracket is formed or arranged a horizontal pin $v$, which extends outwardly from the cylinder at right angles thereto and provides a fulcrum for a forked pendulum-carrier $w$. The said pendulum-carrier is suitably held in place upon said bracket-pin by means of a nut 3, Figs. 11 and 12, or in any other suitable manner. Said pendulum-carrier is of peculiar construction and operates as a lever under the influence of the connection $s$, the valve-rod $r$ being provided at its fulcrumal portion with a hub 31, at the lower side of which is cast or otherwise formed an arm 32, which latter is provided, either integrally or otherwise, with a pin 33, which is adapted to enter a recess $s'$, Fig. 10, in the depending connection $s$, any looseness of motion at this point being taken up by means of an automatically-adjustable bearing-block $s^2$ and spring $s^3$, as will be clearly understood upon reference to said Fig. 10. To permit the introduction of said block $s^2$ to its bearings and at the same time provide a bearing for the outer end of said block and to regulate the tension of the spring, I have employed a hollow bearing-screw $s^{40}$. The connection $s$ is provided with a curvature $s^4$, adapted to allow play to and prevent the said connection from engaging the lever-like pendulum-carrier or the hub 31 thereof as the said connection moves reciprocally with the valve-rod $r$, thus preventing an interference of parts.

At the upper side of the hub 31 of the pendulum-carrier $w$ is cast or otherwise formed an arm 34, which at its upper extremity is bifurcated, the prongs 35 35 being adapted to receive the pendulum $t$ therebetween. The pendulum $t$ is preferably arranged on ball-bearings, and any looseness of movement of said pendulum on said ball-bearings is taken up by means of adjusting-screws 36 36, which are arranged in said prongs, the latter being suitably threaded to receive the same. On the inner sides of the said prongs are bearings for steel cups 37, which latter are chambered on their outer sides, as at 38, to receive the balls 39 and the conical extremity of the adjusting-screws 36 above referred to, all as will better be understood by reference to Fig. 12. The said cups on their inner sides are provided with lugs 371 to enter recesses in opposite sides of the pendulum $t$.

By means of the pronged construction of the pendulum-carrier I secure greater firmness of the pendulum on its bearings, and thus obtain a more perfect regularity of movement of the pendulum, insuring a more exact government of the gas-valve.

The pendulum $t$ is suitably provided at its fulcrumal center with the recesses to receive the lugs 371, and back of the said center it is provided with a seat $t'$, Fig. 11, upon which is secured by screws $t^2$ or other means the pushing-knife 4. Beneath the said fulcrumal center and between the prongs of the pendulum-carrier the said pendulum is provided with a second arm $t^3$, which is vertically slotted, as at $t^4$, Fig. 12, to receive an adjustable weight or its holder 50. The said holder comprises a screw 51, adapted to receive the weight 6, which screw in the preferred form extends through a block 52, adapted to fit the slot $t^4$ and slide vertically therein, the said block being preferably provided with a shoulder 53 to engage the forward face of the arm $t^3$. A nut 54 and collar or washer 55 serve with said shoulder to clamp the said holder firmly upon said arm and yet allow adjustments therein. The forward extremity of the screw 51 carries the weight 6, and this latter is adjustably held in place by means of nuts 56. The adjustment of the weight-holder in the slot regulates the throw of the weight and movement of the pushing-knife in relation to the valve-rod head. The weight is preferably threaded to receive the screw 51, and a nut 56 simply serves as a lock-nut to hold the weight in operative position. The operation of the weight and the parts thus described and purposes of said parts will be more fully described hereinafter.

I am aware that modifications may be made in the construction of the governing parts thus positively described, and I do not wish to be understood as limiting myself to the exact form and arrangement of parts mentioned, although such arrangement is preferred, and I desire to make specific claim thereto.

The valve-rod $r$ has a bearing in the mixing-chamber $f$, as shown in Figs. 15 and 16, and operates the lever 7, which in turn operates the exhaust-valve 71 in the ordinary way. The feed-valve 72 operates automatically in the usual manner.

To operate the valve-rod $r$ and the governor and to do so without the necessity of employing two independent valve-rods and connections, and thus to secure a more simple and less expensive machine, I have operated said valve-rod $r$ by means of a single cam and connections of peculiar construction and arrangement, which I will now proceed to describe. I desire, however, to say before making description of said cam and connections that the rod $r$ may be made in two parts, as shown more clearly in Figs. 2, 3, and 4, where said rod is shown to be in sections $r'$ $r^2$, coupled together by means of a link $r^3$. Said sections are arranged side by side on a bracket $r^4$, and springs $r^5$ are employed to hold the rod in constant contact with the working surfaces of the cam 8. Being coupled together rigidly in the slideways of the bracket, the section $r^2$ is prevented from turning in its slideway and the roller from being thrown from proper relation to the cam. The rod is provided at a point contiguous to the cam 8 with an antifriction-roller $r^6$, above referred to, which is suitably arranged in bearings in a head $r^8$, fastened upon the extremity of the rod. Contiguous to said head the rod-section $r^2$, or to the rod $r$, is arranged on a suitable fixed bearing formed in a stud $r^7$, attached to the bedplate. The said roller $r^6$ is engaged by the working surface of the cam. The said cam is in turn arranged upon a cam-shaft 81, which rotates within a bracket 9, attached to the bed-plate or other fixture of the machine. Upon the said shaft 81 is arranged a gear-wheel 82, which revolves with said cam on said shaft and meshes with a pinion 83, arranged upon the crank-shaft $d$. Movement is thus transmitted from said crank-shaft to the cam-shaft and cam, the movements being reduced by the arrangements of gear wheel and pinion, as shown and described, the reduction being in the preferred construction so that the cam 8 makes one revolution to every two revolutions of the crank-shaft and fly-wheel.

The cam is shown in detail in Figs. 5 and 6 and as shown in Fig. 5 is divided off into quarters by dotted lines to facilitate description. It will appear that the working surfaces of two quarters 81 and 82 of the cam are concentric with the normal circle 83, having the axis of the cam for its center, while the working surfaces 84 and 85 vary from said normal circle, the surfaces 84 extending outside of the normal circle 83 away from the center of the cam and the working surfaces 85 lying in from said normal circle toward the said cam center. By this construction of the cam it will be understood that when the cam 8 rotates in the direction of the arrow the rod will lie at rest when the cam-surfaces 82 83 are in engagement with the roller. When the recessed surface 85 is in engagement, the rod will be reciprocated longitudinally under the power of the spring $r^5$ to actuate the governor preliminary to a valve-operating movement, and when the cam projection 84 is in engagement the said rod is given a reciprocation in the opposite direction to operate the valve-lever 7 and gas-valve.

In operating the engine the master-flame is ignited and the gas turned on to charge the cylinder in any usual way. At the beginning of a cycle the piston moves outward in the cylinder to draw in a charge of gas. When at the inward extreme limit of movement toward the gas inlet-valves, the elevation of the cam 84 will have passed the roller of the valve-rod, and said roller will be at 86 and moving in the direction of the arrow. As the roller traverses the depression of the cam the rod actuated by the spring $r^5$ moves in the direction of the cam and causes a movement of the governor-knife in the reverse direction, and thus if a charge is needed the said knife will impinge upon the rod of the gas-valve and cause an opening of the latter; but should the power be excessive—or, in other words, should the previous explosion have been abnormally powerful—then because of the effect of said abnormal explosion on the weight the said knife will shoot under the head of the said gas-valve rod and the gas-valve $i$ will not be opened by said pushing-knife. During the time of movement from 86 to 87 the piston has drawn in a charge of gas into the cylinder and is about to return to compress said charge. After the depression or back-set surface 85 of the cam 8 has passed the roller of the valve-rod and the latter has arrived at 87 in its movements said cam begins an ineffective movement with reference to the valve-rod $r$, the latter passing over the concentric surfaces 81 82, and thus remaining at rest while the piston compresses its charge, (during the second quarter 82,) and the compressed gas is ignited and exploded, imparting an outward movement of the piston with a greater or less forceful impulse, according to the amount of gas exploded, &c. The outward movement of the piston takes place while the roller is traversing the third quarter 81 of the cam. The engine is now under the influence of the full expansive force of the gas and is at the height of its set speed, undiminished by any compressing action on the gas. As the piston moves inward again the cam projection 84 acts upon the valve-rod $r$ to open the exhaust-valve 71 and the products of combustion are exhausted.

As the cam moves with relation to the valve-rod roller $r^6$ from 86 to 89, causing a rearward longitudinal reciprocation of the said rod and the arm $s$ fixed thereto, the lever-like weight-carrier fulcrumed at $v$ throws the pendulum forward in a direction of movement opposite that of the valve-rod $r$, which movement forces the weight, pendulum, and pushing-knife (the position of the last of which was determined by the force of the previous explosion,) rearward, so that if the force of the impulse imparted to said rod and connections was abnormally powerful the knife at its pushing extremity will be thrown beneath the head $m$ and the gas-valve $i$ will not be opened to permit an inflow of charge; but should the explosion have been normal or light the knife extremity will have been placed in position to engage the head $m$ at the groove $q$ thereof and the gas-valve will be opened to permit an inflow of a new charge.

Having thus described the invention, what I claim as new is—

1. In a gas-engine, the combination with the cylinder and piston, and operating means including a gas-valve and its rod $k$, and an exhaust-valve and the rod $r$, a pendulum-governor receiving its movements from the exhaust-valve rod and transmitting motion to the gas-valve rod, and a cam for operating the said exhaust-valve rod, the said cam having a cam projection 84, and a cam recess or depression 85, the cam projection extending out from the normal circle of the cam for one-fourth of the periphery of the cam, the cam-recess extending in from said normal circle for another quarter of the peripheral distance and the remaining half of said periphery being formed in the normal circle, substantially as set forth.

2. In a gas-engine, the combination with a rod $r$, and a gas-valve having the valve-rod $k$, of an arm $s$, attached to said valve-rod, a lever-like pendulum-carrier fulcrumed upon a bracket, contiguous to said valve-rod, a pendulum pivoted upon said carrier and having arms, to one of which is attached a pushing-blade and the other provided with an adjustable weight, and a cam adapted to engage said valve-rod, and having a recess formed in from the normal circle of said cam followed by a projection extending out from said normal circle of said cam, substantially as set forth.

3. The combination, in a gas-engine, with the cylinder the lever 7, valves 71 and 72, a gas-valve $i$, and a rod for operating the same, the said rod being provided at its outside extremity with a notched or grooved head, a governor for operating said gas-valve rod, the said governor having a lever-like pendulum-carrier fulcrumed contiguous to the gas-valve rod, and a pendulum having a knife for pushing the gas-valve rod, and a weight for governing the position of said pushing-blade, an arm $s$, connected with the rod $r$, for operating the pendulum-carrier, said rod $r$, extending forward to a cam, said cam having a projection and recession from a normal circle concentric with the axial center of said cam, a cog-wheel rotating with said cam, a pinion meshing with said cog-wheel and receiving its power from the crank-shaft of the engine, the said pinion being timed in its relation to the cog-wheel to effect one revolution of the cam for every two revolutions of the crank-shaft, said crank-shaft and a piston, all said parts being arranged and combined, substantially as set forth.

4. The combination, in a gas-engine, with a bracket $u$, and gas-valve rod and valve-rod $r$, having an arm $s$, of a governor comprising the lever-like pendulum-carrier having an arm to engage the arm $s$, and having a forked arm 34, between the prongs of which the pendulum is arranged, the said pendulum being provided with a pushing-blade and weight substantially as set forth.

5. The combination, in a gas-engine, with a bracket $u$, and valve-rod $r$, having an arm $s$, of a governor comprising the lever-like pendulum-carrier having an arm to engage the arm $s$, of the valve-rod $r$, and having a forked arm 34, between the prongs of which the pendulum is arranged on ball-bearings, the said pendulum being provided with a pushing-blade and weight, substantially as set forth.

6. The combination in a gas-engine with a bracket $u$, and rod $r$, having an arm $s$, of a governor comprising the lever-like pendulum-carrier having an arm to engage the arm $s$, of the valve-rod $r$, and having a forked arm 34, between the prongs of which the pendulum is arranged on ball-bearings, the said pendulum being provided with a pushing-blade and weight, the adjusting screws or cones 36, having bearings in said brackets, substantially as set forth.

7. In a gas-engine, the combination with the gas-valve and its rod $k$, and spring $l$, normally holding said gas-valve closed, of a valve-rod head having at its forward end a groove $q$, to receive a pushing-blade and above said groove a forwardly-inclined concavously-surfaced projection, and said pushing-blade attached directly upon a pendulum having an adjustable weight, substantially as set forth.

8. In a gas-engine, the combination with the valve-rod $r$, and operating means, the gas-valve rod and connections a governor including a lever-like pendulum-carrier and its pendulum having a pushing-blade and weight, of an arm $s$, attached to said rod $r$, and operating the pendulum-carrier and provided with a sliding bearing-block $s^2$, and spring $s^3$, said parts being arranged and operating substantially as set forth.

9. In a gas-engine, the combination with the valve-rod $r$, and operating means, the gas-valve rod and connections a governor including a lever-like pendulum-carrier and its pendulum having a pushing-blade and weight, of an arm $s$, attached to said rod $r$, and operating the pendulum-carrier and provided with a sliding bearing-block $s^2$, hollow adjustable bearing $s^4$, and spring $s^3$, said parts being arranged and operating, substantially as set forth.

In testimony that I claim the foregoing I have hereunto set my hand this 30th day of November, 1898.

CONRAD HOERL.

Witnesses:
CHARLES H. PELL,
RUSSELL M. EVERETT.